(12) United States Patent
Huotari et al.

(10) Patent No.: US 8,156,542 B2
(45) Date of Patent: Apr. 10, 2012

(54) CONDITIONAL DATA DELIVERY TO REMOTE DEVICES

(75) Inventors: Allen J. Huotari, Garden Grove, CA (US); Kendra S. Harrington, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 952 days.

(21) Appl. No.: 12/062,889

(22) Filed: Apr. 4, 2008

(65) Prior Publication Data

US 2009/0254976 A1 Oct. 8, 2009

(51) Int. Cl.
*H04L 29/06* (2006.01)

(52) U.S. Cl. ............. 726/3; 726/2; 726/4; 726/5; 726/6; 726/21; 709/201; 709/202; 709/225; 713/153; 713/154; 713/155; 713/168; 713/169

(58) Field of Classification Search ................ None
See application file for complete search history.

(56) References Cited

U.S. PATENT DOCUMENTS

| | | | |
|---|---|---|---|
| 7,167,923 B2 * | 1/2007 | Lo ................................. | 709/245 |
| 7,340,769 B2 | 4/2008 | Baugher | |
| 7,406,079 B2 * | 7/2008 | Yokomitsu et al. ........... | 370/392 |
| 7,500,269 B2 | 3/2009 | Huotari et al. | |
| 7,533,258 B2 | 5/2009 | Baugher | |
| 7,706,263 B2 * | 4/2010 | Zhou et al. .................... | 370/230 |
| 7,916,740 B2 * | 3/2011 | Zheng ........................... | 370/401 |
| 7,941,557 B2 * | 5/2011 | Zhu et al. ...................... | 709/238 |
| 7,954,131 B2 * | 5/2011 | Cholas et al. ................. | 725/112 |
| 8,001,609 B1 * | 8/2011 | Chan et al. ...................... | 726/27 |
| 8,005,988 B2 * | 8/2011 | Maes .............................. | 709/239 |
| 8,019,883 B1 * | 9/2011 | Margulis ....................... | 709/231 |
| 8,051,454 B2 * | 11/2011 | Krikorian et al. ............... | 725/94 |
| 8,060,909 B2 * | 11/2011 | Krikorian et al. ............... | 725/95 |
| 8,068,609 B2 * | 11/2011 | Puranik et al. ................ | 380/270 |
| 8,112,118 B2 * | 2/2012 | Shieh et al. ................... | 455/558 |
| 2002/0103850 A1 * | 8/2002 | Moyer et al. .................. | 709/202 |
| 2002/0191593 A1 * | 12/2002 | O'Neill et al. ................. | 370/352 |
| 2004/0218614 A1 * | 11/2004 | Yokomitsu et al. ........... | 370/401 |
| 2005/0232283 A1 * | 10/2005 | Moyer et al. .................. | 370/401 |
| 2006/0121916 A1 * | 6/2006 | Aborn et al. ................ | 455/456.5 |

(Continued)

FOREIGN PATENT DOCUMENTS

WO 2006/074338 A2 7/2006

(Continued)

OTHER PUBLICATIONS

Contributing Members of the UPnP™ Forum; "Standardized Device Control Protocol (DCP)"; UPnP_IGD_WANIPConnection 1.0.doc (section 2.2.19 InternalClient) and UPnP_IGD_WANPPPConnection 1.0.doc (section 2.2.26 InternalClient); Nov. 12, 2001; US; http://www.upnp.org/standardizeddcps/documents/UPnP_IGD_1.0.zip.

(Continued)

*Primary Examiner* — Syed A. Zia (74) *Attorney, Agent, or Firm* — Patent Capital Group (57) ABSTRACT

In one embodiment a method comprises enrolling a mobile device in a local area network by setting a variable to a mobile device identifier and authenticating the mobile device using a network gateway and the mobile device identifier. A request for data is received from the mobile device and the data is delivered from a service provider to the mobile device.

21 Claims, 5 Drawing Sheets

U.S. PATENT DOCUMENTS

| | | | |
|---|---|---|---|
| 2006/0156392 A1* | 7/2006 | Baugher | 726/5 |
| 2006/0156416 A1 | 7/2006 | Huotari et al. | |
| 2006/0245403 A1* | 11/2006 | Kumar | 370/338 |
| 2006/0256800 A1* | 11/2006 | Harrington et al. | 370/401 |
| 2006/0270448 A1* | 11/2006 | Huotari et al. | 455/552.1 |
| 2007/0147391 A1* | 6/2007 | Wilhoite et al. | 370/395.52 |
| 2007/0281694 A1* | 12/2007 | Lin et al. | 455/435.2 |
| 2008/0057955 A1* | 3/2008 | Choi-Grogan | 455/435.1 |
| 2008/0137673 A1* | 6/2008 | Phuah et al. | 370/401 |
| 2008/0212495 A1* | 9/2008 | Stirbu | 370/254 |
| 2008/0275995 A1* | 11/2008 | Soliman et al. | 709/230 |
| 2009/0100492 A1* | 4/2009 | Hicks et al. | 725/127 |
| 2009/0207905 A1* | 8/2009 | Tomita | 375/240.01 |
| 2009/0271863 A1* | 10/2009 | Govindavajhala et al. | 726/23 |
| 2010/0106966 A1* | 4/2010 | Santos et al. | 713/156 |
| 2010/0172360 A1* | 7/2010 | Maes | 370/401 |
| 2010/0217837 A1* | 8/2010 | Ansari et al. | 709/218 |
| 2011/0002342 A1* | 1/2011 | Zheng | 370/401 |
| 2011/0061090 A1* | 3/2011 | Gillespie et al. | 726/3 |
| 2011/0099286 A1* | 4/2011 | Krikorian et al. | 709/231 |
| 2011/0265109 A1* | 10/2011 | Goyet et al. | 725/9 |
| 2011/0296481 A1* | 12/2011 | Cholas et al. | 725/109 |
| 2012/0011269 A1* | 1/2012 | Krikorian et al. | 709/231 |
| 2012/0028621 A1* | 2/2012 | Lazaridis | 455/417 |
| 2012/0036014 A1* | 2/2012 | Sunkada | 705/14.54 |

FOREIGN PATENT DOCUMENTS

| | | |
|---|---|---|
| WO | 2006/074338 A3 | 7/2006 |
| WO | 2007/050801 A2 | 5/2007 |

OTHER PUBLICATIONS

"CableHome® 1.1 Specification, CH-SP-CH1.1-C01-060728"; sections 8.3.3.4 and 8.3.4.8 and Appendix VII; Jul. 28, 2006; Cable Television Laboratories, Inc.; US; http://www.cablelabs.com/specifications/CH-SP-CH1.1-C01-060728.pdf.

Slingbox product description; © 2005-2008 Sling Media; US; http://www.slingmedia.com/go/slingbox.

Wikipedia; "Mobile IP"; Feb. 26, 2008; US http://en.wikipedia.org/wiki/Mobile_IP.

Securityview, "How Does the UPnP Flaw Works," © 2005-2006, 8 pages; http://www.securityview.org/how-does-the-upnp-flaw-works.html.

Deltathree, "Linksys PAP2 Set-Up Instructions," retrieved and printed on Jan. 10, 2012, 3 pages; http://corp.deltathree.com/productsandservices/setup/s_pap2_instructions.html.

W3, "Protected W3C httpd Setup," 5 pages, Jul. 1995; http://www.w3.org/Daemon/User/Config/AccessAuth.html.

Jonathan M. McCune, et al, "Seeing-Is-Believing: Using Camera Phones for Human-Verified Authentication," retrieved and printed on Jan. 10, 2012, 15 pages; http://www.ece.cmu.edu/~jmmccune/papers/mccunej_believing.pdf.

R. Johnson, et al., "Subscriber-ID Suboption for the Dynamic Host Configuration Protocol (DHCP) Relay Agent Option," Network Working Group, RFC 3993, Mar. 2005, 8 pages; http://tools.ietf.org/html/rfc3993.

ISA, "International Preliminary Report on Patentability (1 page), International Search Report (3 pages), and Written Opinion (8 pages)," PCT/US2006/000411, Jul. 10, 2007, 12 total pages, ISA/US Alexandria, VA USA.

ISA, "International Preliminary Report on Patentability (1 page), International Search Report (1 page), and Written Opinion (7 pages)," PCT/US2006/041858, Apr. 29, 2008, 9 total pages, ISA/US Alexandria, VA USA.

en.wikipedia.org., "Digital Transmission Content Protection," retrieved and printed on Jan. 10, 2012, 2 pages; http://en.wikipedia.org/wiki/Digital_Transmission_Content_Protection.

en.wikipedia.org., "Time to Live," retrieved and printed on Jan. 10, 2012, 2 pages; http://en.wikipedia.org/wiki/Time_to_live.

WorldACCXX, "WorldACCXX Intelligent Telephone Adapter (TA)," Data Sheet, © 2004, 2 pages; http://www.voipsupply.com/datasheets/ta200_ds.pdf.

* cited by examiner

CONDITIONAL DATA DELIVERY TO REMOTE DEVICES

TECHNICAL FIELD

The present disclosure relates generally to data communications network traffic delivered to a home client being securely redirected to a remote client device.

BACKGROUND OF THE INVENTION

Universal Plug and Play (UPnP®) is a set of communications network protocols promulgated by the UPnP Forum. The UPnP® architecture allows peer-to-peer networking of PCs, networked appliances, and wireless devices. It is a distributed, open architecture based on Transmission Control Protocol/Internet Protocol (TCP/IP), User Datagram Protocol (UDP) and Hypertext Transfer Protocol (HTTP). UPnP® enables communication between any two devices under the command of any control device on a local area network (LAN).

One example of UPnP® device is an Internet Gateway Device (IGD) (referred to herein as a Residential Gateway (RG)) which may be used to connect various devices in a residential LAN to the internet using a service provider (SP) and also to each other. The RG may be embedded with a modem and a router or may comprise separate physical devices such as a bridge modem and external router. The RG may also include any number of connection bridges such as an Ethernet® switch, an 802.11 Access Point (AP), a Multimedia over Coax Alliance (MoCA®) bridge or other similar devices.

Some RGs may allow a roaming (portable, mobile) UPnP® client to receive traffic that is sent "home" so that mobile devices may benefit from services delivered to their home network despite the fact that the mobile device is not home. Existing methods for redirecting traffic (or re-broadcasting content) from the home have a number of limitations. For example, only one client can legitimately receive traffic. Also, all clients desiring this service would have to be present in the "home" at one point. Further, the traffic would need to traverse the home network (and be redirected/rebroadcast) in order to reach the roaming client. In addition, redirected traffic may be redirected to illegitimate sites (i.e., public venues such as sports bars).

DESCRIPTION OF EXAMPLE EMBODIMENTS

The following detailed description includes the best currently contemplated modes of carrying out the invention. The description is not to be taken in a limiting sense, but is made merely for the purpose of illustrating the general principles of the invention, since the scope of the invention is best defined by the appended claims.

Overview

In one embodiment a method comprises enrolling a mobile device in a local area network having a Residential Gateway by setting a variable to a mobile device identifier when the mobile device is disposed locally with respect to the Residential Gateway; receiving a request for data from the mobile device when the mobile device is not disposed locally with respect to the Residential Gateway; and delivering the data from a service provider to the mobile device, when the mobile device is not disposed locally with respect to the Residential Gateway.

In another embodiment an apparatus comprises a mobile device identified by a mobile device identifier; and a network gateway connected to a service provider through a local area network; in which the mobile device is enrolled in the local area network by setting a Universal Plug and Play ExternalClient variable in the network gateway to the mobile device identifier; the mobile device is authenticated using the mobile device identifier; and data is delivered to the mobile device in response to a request for the data from the mobile device.

In a further embodiment an apparatus comprises a network gateway connected to a service provider through a local area network; means for enrolling a mobile device in the local area network using a mobile device identifier; means for authenticating the mobile device using the mobile device identifier; and means for delivering data to the mobile device in response to a request for the data from the mobile device.

Description

Broadly, the present invention may provide access to data from a service provider (SP) to a remote device in a communications network. Embodiments of the present invention may make use of a UPnP® "hole" to provide a simple but secure method to redirect data and media streams to remote devices, for example, mobile devices. Embodiments also may provide functionality comparable to currently available data forwarding/redirection devices, while also allowing the SP to maintain more control over content as compared to prior systems. For example, such control may include content protection controls such as control over where content is sent. Embodiments of the present invention may be advantageously used in wired or wireless communications systems having mobile devices.

In some communications systems, only one client can legitimately receive traffic and all clients desiring service would have to be present in the "home" (e.g., local area network) at one point. With the present invention, more than one client may legitimately receive traffic and clients may not be required to be physically "home" at one point.

Figure 1:
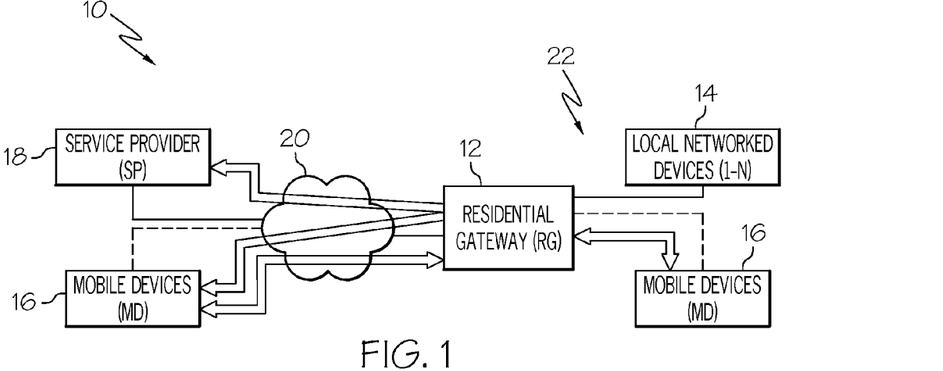
FIG. 1 is a block diagram of network topology illustrating an example of a communications network in accordance with one embodiment of the present invention.

FIG. 1 illustrates a network topology of an example of a communications network 10 that includes a Residential Gateway (RG) 12 connected to one or more local networked devices 14. The RG 12 may include an embedded modem and router or may comprise separate physical devices such as a bridge modem and external router. The RG 12 may include any number of LAN connection bridges such as an Ethernet® switch, an 802.11 AP, a MoCA® bridge, or others. One or more mobile devices (MD) 16 may also be connected to the RG 12. The one or more mobile devices 16 may be located locally or may be at other locations. A service provider, SP 18, may provide services, such as internet services, through a wide area network (WAN) 20, such as the internet. The RG 12, the local networked devices 14 and the MD 16 may comprise a home LAN 22.

The MD may access an authorization function that may be built into the RG or into a separate device. For example, the authorization may reside in any of the local networked devices 14 besides the RG 12. This authorization function may be referred to as a home services manager. For simplicity, in the embodiments described in FIGS. 2-5 the authorization function may reside in the RG 12.

The UPnP® Internet Gateway Device (IGD) specifications describe a variable, called an InternalClient, that can be used for the purpose of configuring the IGD. For example, a Residential Gateway (RG) may be used to direct inbound (downstream) traffic to a specific address defined by the value of InternalClient. Although the intent of this variable is to define a local client, some poor implementations of UPnP® IGD allow the variable to be set to either a public Internet Protocol (IP) address or a Domain Name System (DNS) name—thus redirecting inbound traffic to an external client. A potential security hole is that a widespread proliferation of malicious clients (that are UPnP® compliant) can individually assign this variable per IGD to an address different from its own. As a result, a denial of service (DoS) attack may occur by redirecting traffic from numerous IGDs, and even worse, may make it look like the IGDs were the culprits sending the traffic.

A solution for fixing this "security hole" is to require that a) only a device physically on the LAN can change the variable, b) the device changing the variable can only change it to its own address, and c) the variable can only be changed to a local (private) IP address. However, this (or a similar) variable may also be used for benign and beneficial purposes by allowing a roaming (portable, mobile) client to receive traffic that is sent "home". For example, this variable may be used to allow mobile devices to benefit from services delivered to their home network despite the fact that the mobile device is not home. Some systems, which can redirect traffic (or rebroadcast content) from the home to a mobile device, have some disadvantages. For example, only one client can legitimately receive traffic. Also, the traffic would have to traverse the home network (and be redirected/rebroadcast) in order to reach the roaming client. With embodiments of the invention, more than one client can legitimately receive traffic and traffic does not have to traverse the home network. Furthermore, redirecting the traffic only to specific, authorized devices can help prevent traffic from being redirected to illegitimate sites (i.e., public venues such as sports bars) even in the instances where only one connection is permitted to the home.

The "security hole" with the existing UPnP® variable InternalClient may be fixed by the solution described above. In accordance with an embodiment of the present invention, if the InternalClient variable is locked down a new variable can be created. In particular embodiments, a new variable (ExternalClient) may have the same properties as InternalClient, with two possible restrictions added. One restriction is that only a device present on the home LAN 22 (physically present or logically present via a secure tunnel) can change the variable. Another restriction is that the device changing the variable can only change it to its own address/name. In cases where the client uses Dynamic Host Configuration Protocol (DHCP), then a name may be used.

There are at least three issues to address when enabling traffic delivered to the home to be redirected to a remote client. A first issue may be how to "disallow" malicious local clients; that is, how to tell if a trusted client has become untrusted. A second issue may be how to restrict traffic to be forwarded depending upon geographic location of client, for example by not forwarding content to a region that is "blacked out". A third issue may be how to prove a remote client device has been on the home LAN.

In particular embodiments of the present invention, a number of solutions may be employed to deal with the three issues described above. With respect to the first issue (how to tell if trusted client has become untrusted) there are at least two possible solutions. For one solution, in accordance with an embodiment, it is recognized that any individual client on the home LAN 22 is trusted at one point. If the client is wireless it will have wireless encryption; if wired, the client will have a physical connection. Since UPnP® may rely on the notion that all clients on the home LAN 22 are trusted, this embodiment does not address higher layer LAN security issues, e.g., malicious applications, utilities, or other code running on UPnP® clients for devices that are legitimately allowed to be on the home network (i.e., misbehaving but authorized "trusted" clients).

Another solution may be to restrict the variable to only allow a device to change the variable to its own address; but to allow the address to be a public or private address, Dynamic Domain Name System (DDNS) name. The device must be on the same subnet of the RG 12 in order to change the variable. This solution may help prevent DoS attacks since the device cannot set up a DoS attack to another client/address.

The second issue described above was how to restrict traffic to be forwarded depending upon geographic location of client. Many SPs (and content providers) have indicated that it is desirable that honest people should be able to access content they legitimately subscribe to wherever they are; hence, validating remote geographic location is not a prohibitive requirement. One solution is to not forward traffic to a public IP address if the client requesting such is still on the LAN. This solution may help in preventing traffic being forwarded illegitimately.

The third issue described above was how to prove a remote client device has been on the LAN. One possible solution to this issue is to recognize that the device is required to have been on home LAN 22 in order to change the variable. Hence, if the variable has been changed, then the system will recognize that the device has been on the home LAN 22. Another possible solution is to determine whether the device has enrolled with the RG 12 using some other secure method. If this is the case, it can be recognized that the device has been on the home LAN 22 (or is not required to have been on the home LAN 22).

There may be four steps for allowing a MD 16 to remotely and legitimately access services delivered to a home. The four steps may include 1) enrolling the MD 16; 2) authorizing (which may include validating, authenticating) the MD 16; 3) the MD 16 requesting data; and 4) delivering the data to the MD 16. Each of these steps may have several possible embodiments as described below.

Figure 2A:
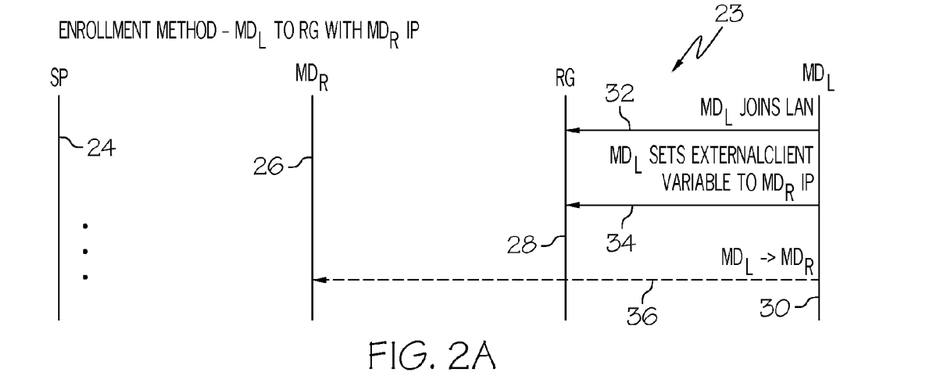
FIG. 2A is a network communication signaling diagram (time proceeding from top to bottom) illustrating a first enrollment method for use with the communications network shown in FIG. 1.
Figure 2B:
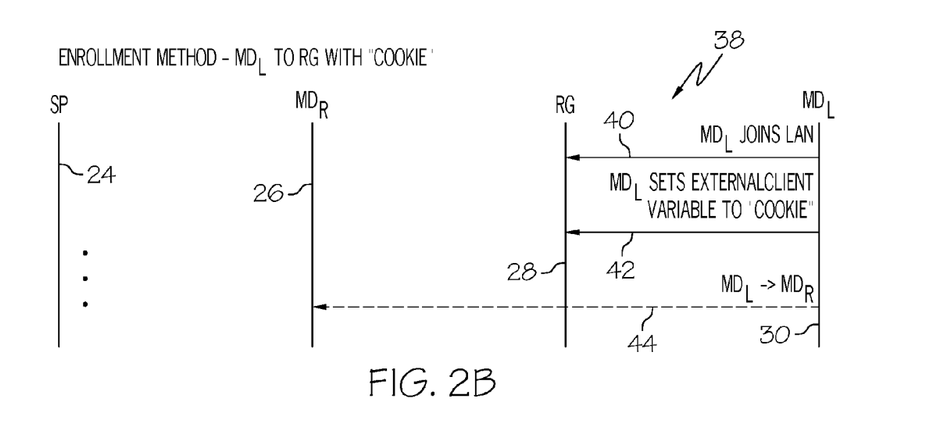
FIG. 2B is a network communication signaling diagram illustrating a second enrollment method for use with the communications network shown in FIG. 1.
Figure 2C:
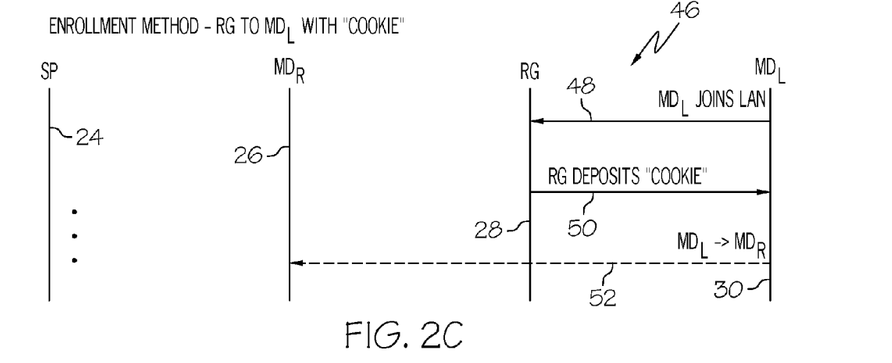
FIG. 2C is a network communication signaling diagram illustrating a third enrollment method for use with the communications network shown in FIG. 1.

Three examples of enrollment methods are shown in FIGS. 2A, 2B and 2C. The purpose of enrollment is to identify MDs 16 that are legitimately entitled to receive home services (even if remote) by establishing a membership (or binding) to a home network. All three example enrollment methods can be used with all of the authorizing, requesting data, and delivering data examples described subsequently in this document, so for simplicity only the first enrollment method, shown in FIG. 2A, will be referenced in the later discussions.

When an MD 16 is local it will be referred to as a mobile device local (MDL) and when the MD 16 is non-local it will be referred to as a mobile device remote (MDR). All three enrollment methods can use the knowledge that the MDL has access to the home LAN 22 at some point before going remote. Access is defined as any IP connection to the home LAN 22 side of the RG 12, or as a connection to a third device acting as the home service manager (not shown). Regarding the security of the connection it is expected that any device connected to the home LAN 22 is trusted. For the first and second enrollment methods a priori knowledge of the MDR IP address may be required, and this IP address may be dynamic, static, or a name that is part of a DDNS service.

FIG. 2A is a communication signaling diagram illustrating a first enrollment method 23. With reference to the communications network shown in FIG. 1, the SP 18 is represented by vertical line 24; the MD 16 when in a remote location (MDR) is represented by vertical line 26; the RG 12 is represented by vertical line 28; and the MD 16 when local (MDL) is represented by vertical line 30. Time is represented vertically in the signaling diagrams, with time proceeding downward (earlier nearer the top, later nearer the bottom) in the diagrams of FIGS. 2A-5C.

Arrow 32 represents the process of the MDL joining the home LAN 22 by making a connection to the RG 12. The MDL may next set the ExternalClient variable to the MDR IP address, as shown by arrow 34. The RG 12 can use this information in later steps to validate and authorize the MDR and/or to redirect traffic to the MDR. Arrow 36 represents the movement of MDL to a remote location where it becomes an MDR.

FIG. 2B is a communication signaling diagram illustrating a second enrollment method 38. After the MDL joins the home LAN 22, arrow 40, the MDL may connect to the RG 12. The MDL can set the ExternalClient variable on the RG 12 to a random ID that may also be stored in the MDL, as shown by arrow 42. The RG 12 can use this information in later steps to validate and authorize the MDR. The MDL may then move to a remote location and become an MDR as indicated by arrow 44.

The ID could also be an alternate, additional variable if the ExternalClient variable is already used for storing the address as in the first enrollment method 23. It may be advantageous for the RG 12 to dynamically generate and retain this identifier, and then pair it to the ExternalClient variable. Thus, when the MDR client is remote and seeks access, this identifier can be used as a "shared secret". The media access control (MAC) address of the RG could be used as this shared secret, but it may be preferred to have the identifier be dynamic and eventually expire (unless legitimately refreshed).

FIG. 2C is a communication signaling diagram illustrating a third enrollment method 46. In the third enrollment method 46, after the MDL joins the home LAN 22 and connects to the RG 12 as shown by arrow 48, the RG 12 may write the contents of the ExternalClient variable into the MDL to a random ID stored in the RG 12 as shown by arrow 50. Alternatively the MDL may read the value from the RG 12. The RG 12 may use this ID information in later steps to validate and authorize the MDL when the MDL moves to a remote location and becomes MDR as shown by arrow 52.

As with the second enrollment method 38, this random ID could also be an alternate, additional variable if the ExternalClient variable is already used for storing the address as in the first enrollment method 23. It may be advantageous for the RG 12 to dynamically generate and retain this identifier, and then pair it to the ExternalClient variable. Thus, when the MDR client is remote and seeks access, this identifier can be used as a "shared secret". It may be noted that a "cookie" could be used as a device/service ID. In other words, this variable could not only be used to register/enroll/reenroll the MDR but also the service(s) it is entitled to receive.

Furthermore, there are at least four examples of embodiments (and implementation methods) where the MDL does not migrate to MDR, and where it is possible that the MDR was not physically at home during the enrollment stage, but where the above-described communication signaling diagrams could still apply. One of these four embodiments is one in which the MDL is a separate device that has authorization to make changes on the RG 12 on behalf of the MDR (e.g., a VoIP base station on behalf of a VoIP mobile phone or a Media Server on behalf of a paired mobile Media Sink). A second embodiment is one in which the RG 12 is pre-provisioned during shipping with enrollment information. A third embodiment is one in which the RG 12 is provisioned by a SP 18 that has authorization to make changes on the RG 12. A fourth embodiment is one in which the MDR establishes a tunnel to the home network and thus establishes a logical (virtual) presence that is indistinguishable from being physically present. In this case, the MDR appears to be an MDL.

In these four exemplary embodiments, it may be preferable for better content protection that the MD 12 actually be physically at home at least once. However, these four options can be made more secure by combining with a secondary registration by the MDR (e.g., as exemplified in the second and third enrollment methods 38 and 46).

Figure 3A:
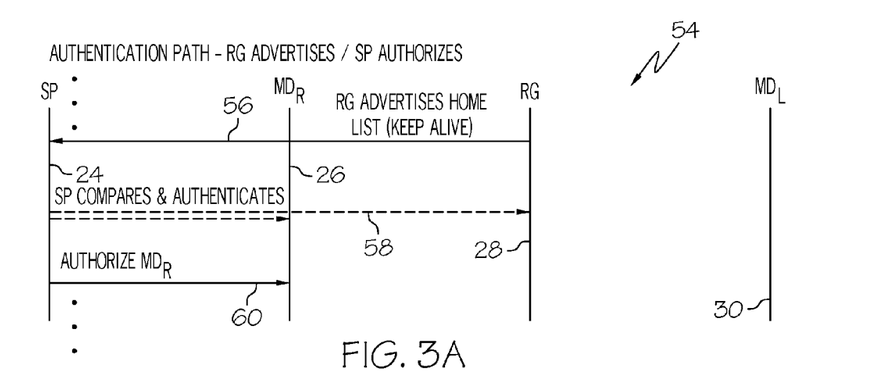
FIG. 3A is a network communication signaling diagram illustrating a first authentication method for use with the communications network shown in FIG. 1.
Figure 3B:
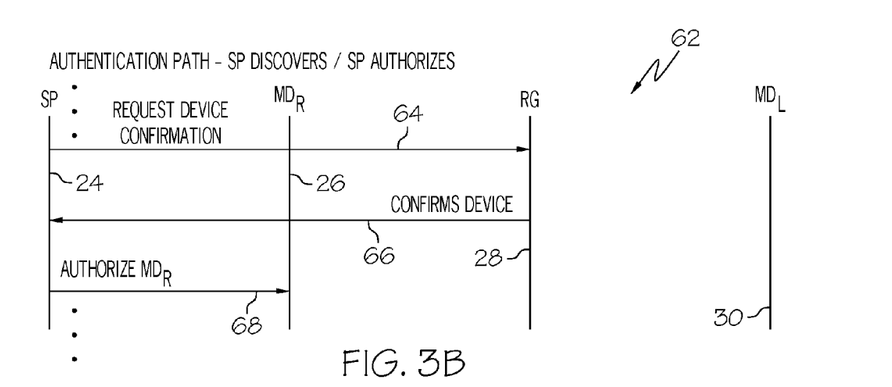
FIG. 3B is a network communication signaling diagram illustrating a second authentication method for use with the communications network shown in FIG. 1.
Figure 3C:
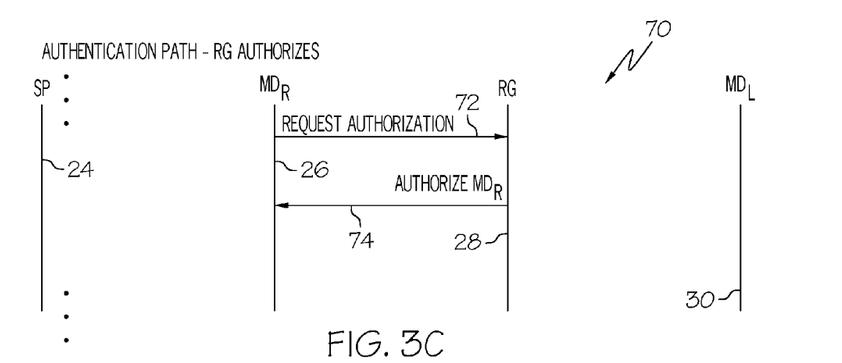
FIG. 3C is a network communication signaling diagram illustrating a third authentication method for use with the communications network shown in FIG. 1.

There are three examples of authentication methods (or paths) described in FIGS. 3A, 3B and 3C. FIG. 3A is a communication signaling diagram illustrating a first authentication method 54. As shown by arrow 56, the RG 12 may actively advertise a "home list" of authorized MDR devices, including the ExternalClient variable established in the enrollment processes shown in FIGS. 2A-2C. In some embodiments, this advertisement may be encrypted. This list can expire, and if so, the RG can issue a "keep alive" with a new home list. This home list can be inclusive of every device registered with the RG 12, or can be limited to those devices that have registered with the RG 12 and are not currently "at home".

After an MDR makes a request for data (e.g., using methods described below in connection with FIGS. 4A-4C), the SP 18 can compare the IP addresses on the home list it has received from the RG to the IP address of the MDR requesting data as shown by arrows 58. The SP 18 then may authorize the MDR as shown by arrow 60. Since the SP 18 is the authorizing entity, the data request from an MDR must come directly to the SP 18; as a result, first authentication method 54 can only be used with the first data request path 76 described below and shown in FIG. 4A.

FIG. 3B is a communication signaling diagram illustrating a second authentication method 62. In this method 62, after the SP 18 receives a request for data (e.g., using methods described below in connection with FIGS. 4A-4C), the SP 18 can send a request device confirmation (discovery) to the RG 12, including the MDR IP address, as shown by arrow 64. The RG 12 may compare the MDR IP address to the IP address in the ExternalClient variable established in one of the enrollment processes shown in FIGS. 2A-2C, and respond to the SP 18 with a device confirmation as shown by arrow 66. Alternatively the RG 12 could simply reply with the home list and the SP 18 could compare and authenticate. The MDR can then be authorized by the SP 18 as shown by arrow 68. Since SP 18 is the authorizing entity, the data request can preferably come directly to the SP; as a result, the second authentication method 62 can preferably be used with the first data request method 76 shown in FIG. 4A (or similar embodiments).

FIG. 3C is a communication signaling diagram illustrating a third authentication method 70. In this method 70, the MDR may request authorization directly from the RG 12 as shown by arrow 72. The RG 12 may compare the MDR IP address to the IP address in the ExternalClient variable established in the enrollment step and may authorize the MDR accordingly as shown by arrow 74. In this method 70, the MDR may have a priori knowledge of the RG 12 WAN IP (address or name). Since the RG 12 is the authorizing entity, the data request can preferably come directly to the RG. As a result, the third authentication method 70 can preferably be used with either the second 80 (shown in FIG. 4B) or third 86 (shown in FIG. 4C) data request methods (or similar embodiments), described below.

Data Request Paths

Figure 4A:
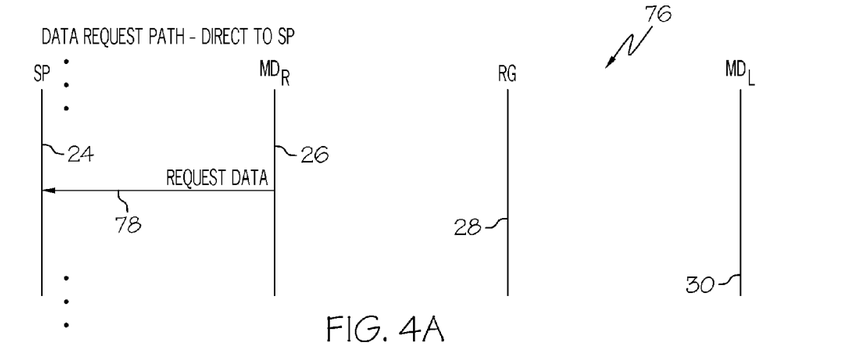
FIG. 4A is a network communication signaling diagram illustrating a first data request path for use with the communications network shown in FIG. 1.
Figure 4B:
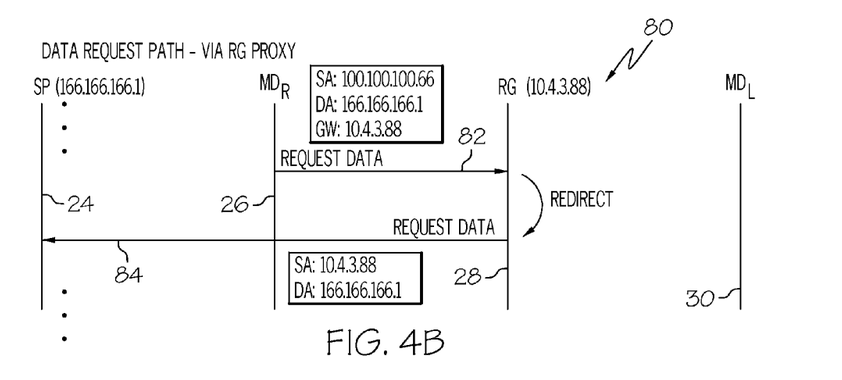
FIG. 4B is a network communication signaling diagram illustrating a second data request path for use with the communications network shown in FIG. 1.
Figure 4C:
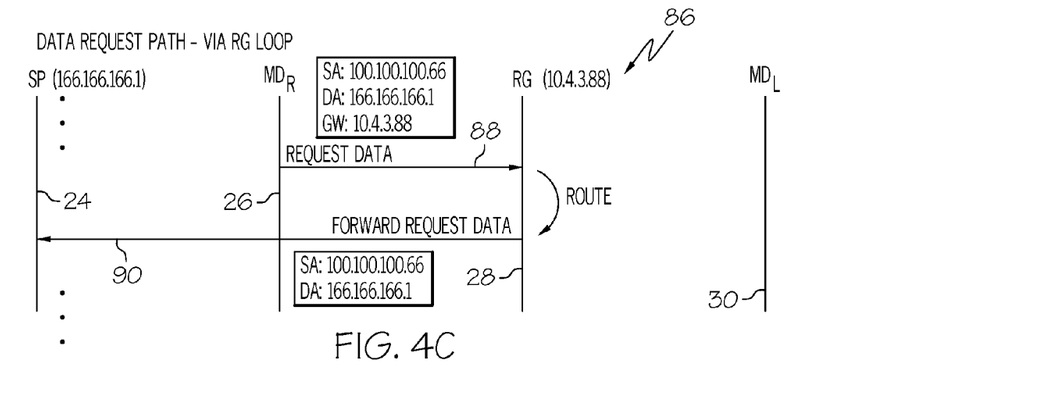
FIG. 4C is a network communication signaling diagram illustrating a third data request path for use with the communications network shown in FIG. 1.

Three examples of data request methods are shown in FIGS. 4A, 4B and 4C. FIG. 4A is a communication signaling diagram illustrating a first data request method 76. In this method 76, the MDR may request data directly to the SP 18, as shown by arrow 78. This method can preferably be used if the SP 18 is the authorizing entity in the authorizing step, which is the case with the first 54 and second 62 authorizing methods. As the data request is sent directly to the SP 18, the resulting data stream can preferably be sent directly to the MDR (described below as the first data path 92, see FIG. 5A) or routed via an RG "route" (described below as the third data path 102, see FIG. 5C).

FIG. 4B is a communication signaling diagram illustrating a second data request method 80. The MDR may request data via the RG 12, as shown by arrow 82, and the RG 12 may redirect the request to the SP 18 as shown by arrow 84. This redirect function can disguise the actual destination and source addresses such that the data request to the SP 18 appears to originate from the RG 12. Because the actual addresses are disguised, this method can preferably be used if the RG 12 is the authorizing entity in the authorizing step, namely the third authorizing method 70. As the data request is sent to the RG 12 and redirected to the SP 18, the resulting data stream can follow the reverse direction and may be sent to the RG 12 and redirected back to the MDR (described below as the second data path 96, see FIG. 5B).

FIG. 4C is a communication signaling diagram of a third data request method 86. In this method 86, MDR may request data via the RG 12, as shown by arrows 88 and 90. This method 86 can preferably be used if the RG 12 is the authorizing entity, as in the third authorizing method 70. As the data request is routed via an RG 12 "route", the resulting data stream can either be sent directly to the MDR (as described below as the first data path 92, see FIG. 5A) or routed via the same RG 12 "route" (as described below as the third data path 102, see FIG. 5C).

Figure 5A:
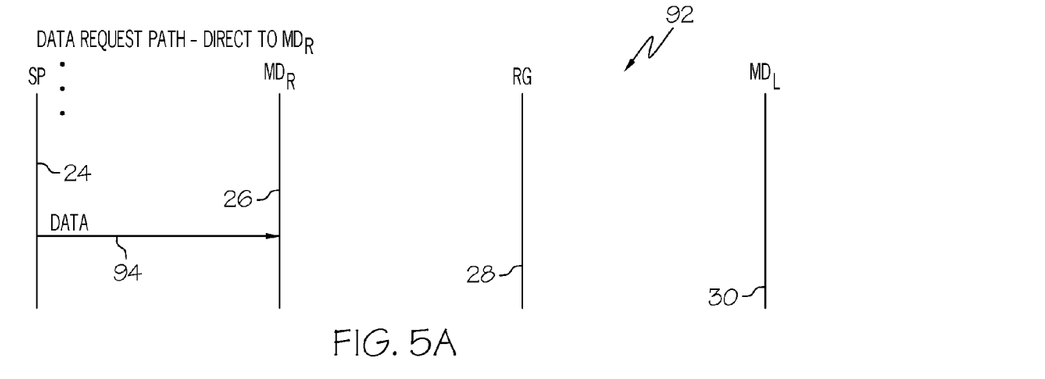
FIG. 5A is a network communication signaling diagram illustrating a first data path for use with the communications network shown in FIG. 1.
Figure 5B:
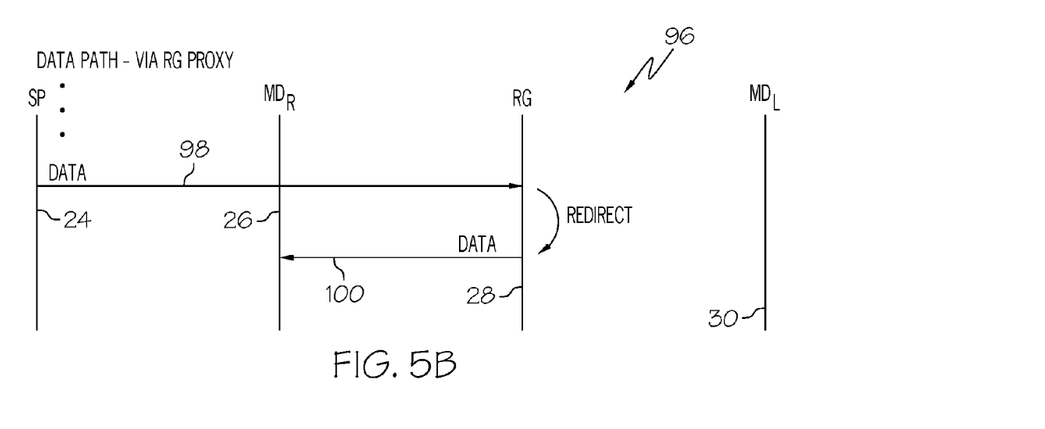
FIG. 5B is a network communication signaling diagram illustrating a second data path for use with the communications network shown in FIG. 1.
Figure 5C:
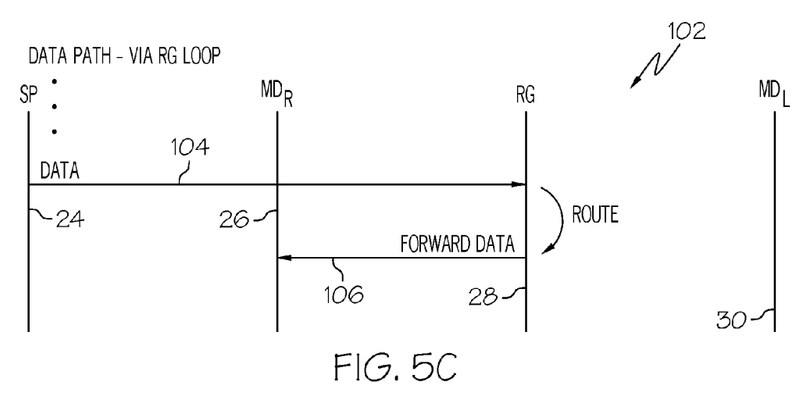
FIG. 5C is a network communication signaling diagram illustrating a third data path for use with the communications network shown in FIG. 1.

Three examples of data path methods are shown in FIGS. 5A, 5B and 5C. FIG. 5A is a communication signaling diagram illustrating a first data path method 92. In this method 92, the SP 18 can send data directly to the MDR, as shown by arrow 94. This method 92 can preferably be used if the data request is sent directly to the SP 18 (as in the first data request method 76) or is routed via an RG "route" (as in the third data request method 86).

FIG. 5B is a communication signaling diagram illustrating a second data path method 96. In this method 96, the SP 18 can send data to the RG 12, as shown by arrow 98. The RG 12 can redirect the data to the MDR as shown by arrow 100. This redirect function may disguise the actual destination and source addresses such that the data appears to originate from the RG 12. Because the actual addresses are disguised, this method 96 can preferably be used if the data request was redirected via the RG 12, such as in the case with the second data request method 80.

FIG. 5C is a communication signaling diagram illustrating a third data path method 102. In this method 102, the SP 18 may send data to the MDR via the RG 12, as shown by arrows 104 and 106. This method 102 can preferably be used if the data request is sent directly to the SP 18 (as with the first data request method 76) or is routed via an RG 12 "route" (as with the third data request method 86).

In summary, it may be seen that the present invention may provide a system and method for providing conditional data delivery to remote devices, while allowing a service provider to maintain more control over where the streams of data are sent and other content protection issues.

It should be understood, of course, that the foregoing relates to exemplary embodiments of the invention and that modifications may be made without departing from the spirit and scope of the invention as set forth in the following claims.

We claim:

1. A method comprising:
   determining, at a first instance, that a mobile device is disposed locally with respect to a Residential Gateway of a local area network based on an identification that said mobile device connects to said Residential Gateway while said mobile device is physically disposed within said local area network;
   allowing said mobile device to enroll in said local area network by setting a variable to a mobile device identifier to correspond to said mobile device while said mobile device is disposed locally with respect to said Residential Gateway, wherein setting of said variable to said mobile device identifier is limited to mobile devices determined to be disposed locally with respect to said Residential Gateway;
   receiving a request for data originating from said mobile device at a second instance subsequent to said first instance when said mobile device is disposed remotely with respect to said Residential Gateway; and
   delivering said data from a service provider to said mobile device, when said mobile device is disposed remotely with respect to said Residential Gateway based on said enrollment of said mobile device while physically disposed within said local area network.

2. The method of claim 1 wherein said variable is a Universal Plug and Play ExternalClient variable.

3. The method of claim 1 wherein said mobile device identifier is stored in said mobile device.

4. The method of claim 1 wherein said enrolling comprises said mobile device setting said variable to said mobile device identifier.

5. The method of claim 1 wherein said enrolling comprises setting a cookie on said Residential Gateway to a random identifier.

6. The method of claim 1 wherein said enrolling comprises said Residential Gateway writing said variable into said mobile device, said variable being a random identifier stored in said Residential Gateway.

7. The method of claim 1, further comprising:
authenticating said mobile device, wherein said Residential Gateway transmits said mobile device identifier to said service provider.

8. The method of claim 1, further comprising:
authenticating said mobile device, wherein said service provider sends a device confirmation request to said Residential Gateway.

9. The method of claim 1, further comprising:
authenticating said mobile device, wherein said mobile device sends a request for authorization to said Residential Gateway.

10. The method of claim 1 wherein said receiving a request comprises said service provider receiving said request for data from said mobile device.

11. The method of claim 1 wherein said receiving a request comprises:
said Residential Gateway receiving said request for data from said mobile device, and
said Residential Gateway redirecting said request for data to said service provider.

12. The method of claim 1 wherein said receiving a request comprises:
said Residential Gateway receiving said request for data from said mobile device, and
said Residential Gateway routing said request for data to said service provider.

13. The method of claim 10 wherein said delivering said data comprises sending data in response to said request from said service provider to said mobile device.

14. The method of claim 11 wherein said delivering said data comprises sending data in response to said request from said service provider to said Residential Gateway and redirecting said data from said Residential Gateway to said mobile device.

15. The method of claim 12 wherein said delivering said data comprises sending data in response to said request from said service provider to said Residential Gateway, and routing said data from said Residential Gateway to said mobile device.

16. An apparatus comprising:
a mobile device identified by a mobile device identifier; and
a network gateway connected to a service provider through a local area network, wherein:
said mobile device is enrolled in said local area network by setting a Universal Plug and Play ExternalClient variable in said network gateway to said mobile device identifier,
wherein enrolling said mobile device in said local area network includes:
determining that said mobile device is disposed locally with respect to said network gateway; and
allowing said mobile device to enroll in said local area network by setting a variable to said mobile device identifier to identify said mobile device while said mobile device is disposed locally with respect to said network gateway, wherein setting of said variable to said mobile device identifier is limited to mobile devices determined to be disposed locally with respect to said network gateway;
said mobile device is authenticated using said mobile device identifier; and
data is delivered to said mobile device in response to a request for said data from said mobile device.

17. The apparatus of claim 16 wherein said network gateway is a Residential Gateway.

18. The apparatus of claim 16 wherein said Universal Plug and Play ExternalClient variable is an Internet Protocol address.

19. An article comprising non-transitory, machine-readable media storing instructions operable to cause at least one processor to perform operations comprising:
determining, at a first instance, that a mobile device is disposed locally with respect to a Residential Gateway of a local area network based on an identification that said mobile device connects to said Residential Gateway while said mobile device is physically disposed within said local area network;
allowing said mobile device to enroll in said local area network by setting a variable to a mobile device identifier to correspond to said mobile device while said mobile device is disposed locally with respect to said Residential Gateway, wherein setting of said variable to said mobile device identifier is limited to mobile devices determined to be disposed locally with respect to said Residential Gateway;
receiving a request for data originating from said mobile device at a second instance subsequent to said first instance when said mobile device is disposed remotely with respect to said Residential Gateway; and
delivering said data from a service provider to said mobile device, when said mobile device is disposed remotely with respect to said Residential Gateway based on said enrollment of said mobile device while physically disposed within said local area network.

20. The method of claim 1, further comprising:
identifying, in response to receiving the request for data, that an address of said mobile device corresponds to a value of said set variable;
identifying a random identifier included in the request for data;
determining that said random identifier corresponds to a particular random identifier paired to said variable, wherein said particular random identifier was paired to said variable during enrollment of said mobile device; and
wherein delivering said data from said service provider to said mobile device is further based on the determining that said random identifier corresponds to said particular random identifier paired to said variable.

21. The method of claim 2, wherein said Residential Gateway maintains the Universal Plug and Play ExternalClient variable and a Universal Plug and Play InternalClient variable, wherein the Universal Plug and Play InternalClient variable is locked.

* * * * *